MONOSTABLE COMPARATOR CIRCUIT

Filed Dec. 13, 1965

HIRO MORIYASU
*INVENTOR*
*BY*
*BUCKHORN, BLORE, KLARQUIST & SPARKMAN*
*ATTORNEYS*

United States Patent Office 3,473,044

Patented Oct. 14, 1969

3,473,044

MONOSTABLE COMPARATOR CIRCUIT

Hiro Moriyasu, Portland, Oreg., assignor to Tektronix, Inc., Beaverton, Oreg., a corporation of Oregon Filed Dec. 13, 1965, Ser. No. 513,407

Int. Cl. H03k 5/20

U.S. Cl. 307—235 12 Claims

ABSTRACT OF THE DISCLOSURE

A monostable comparator circuit includes a pair of cross-coupled transistors and a first time constant means for determining the duration of an output pulse produced. After triggering, a second time constant means prevents the circuit from being retriggered for a predetermined period.

Figure 1:
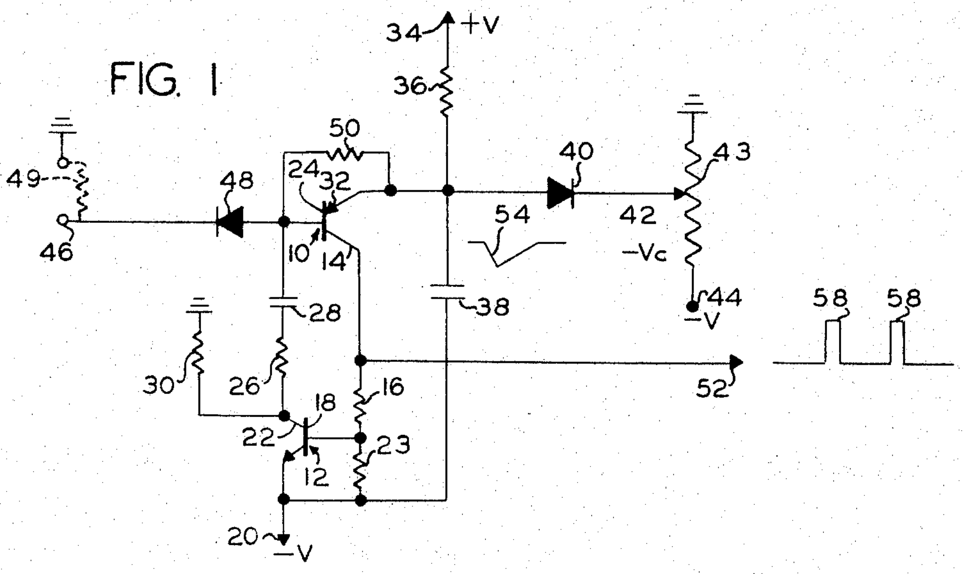

This invention relates to a monostable comparator circuit and particularly to such a circuit adapted for triggered operation employing a wide variety of input signals.

Many triggered circuits, multivibrators and the like, produce one or more output pulses when triggered with a particular kind of input pulse. If AC input coupling is employed, the circuit will operate when a selected transient occurs in the input signal. Generally a steady DC input applied to such a circuit produces no output, regardless of the magnitude of the DC level. On the other hand, if the circuit involves DC input coupling the multivibrator will itself become latched in a DC condition as long as a steady DC input is applied and an output pulse in the usual sense is not generated.

Furthermore, multivibrators and the like operable on a low frequency input signal frequently will not respon to a high frequency input signal, if, for example, such a high frequency input signal has a higher frequency than the pulse repetition rate of the multivibrator. Such circuits often do not count down accurately from the high frequency input signal.

Thus, multivibrators as heretofore employed are frequently more responsive to the shape or rise of an input signal than to its voltage level, or if responsive to DC will not shut off. Such circuits are not effective for triggering of a pulse output on the criteria of a signal magnitude alone.

It is accordingly an object of the present invention to provide an improved monostable circuit producing one or more output pulses in response to the triggering of an input signal wherein the shape, frequency, and duration of the input signal required are noncritical.

It is another object of the present invention to provide an improved monostable circuit operable only on receipt of an input trigger pulse exceeding a predetermined voltage level.

It is another object of the present invention to provide an improved monostable circuit for producing output pulses so long as an input triggering signal continues to exceed a predetermined triggering level, regardless of the frequency of the triggering signal, with such circuit being capable of counting down from one frequency to another.

In accordance with an embodiment of the present invention a monostable comparator circuit includes a pair of cross-coupled amplifier stages including a time constant circuit in one cross-coupling for determining the length of the output pulse. A second time constant circuit is coupled across one amplifier stage and has a time constant longer than the first mentioned time constant circuit. This circuit is effective for biasing such stage in a condition nonreceptive of trigger pulses. After a predetermined period, the circuit will once again accept a trigger pulse, or a DC level, for triggering the circuit, so long as the level or signal continues to exceed the predetermined voltage level.

The said second time constant circuit is desirably coupled to an adjustable voltage source so the circuit will not be triggered unless the input pulse exceeds such voltage. When the circuit is triggered, both the voltage source and the input trigger are disconnected until such time as the second time constant circuit permits reconnection thereof and subsequent retriggering.

The circuit in accordance with the present invention will produce an output pulse in response to triggering with a very narrow input pulse having a low repetition rate for example. The circuit will also trigger from a DC level or perform high frequency countdown if the triggering signal is a high frequency one. If the incoming signal rate exceeds the basic rate of the monostable circuit, the monostable circuit will count down or provide an output without failure as the incoming rate increases up a million times faster. The circuit is amplitude discriminating. That is, the magnitude of the input signal capable of triggering the circuit is predetermined.

It is found the circuit according to the present invention is particularly useful in automatic sensitivity-seeking oscilloscopes and the like, since such oscilloscopes handle a variety of input signals. The circuit is not primarily sensitive to shape of the signal but continues to produce output pulses so long as the input trigger continues to occur, and continues to exceed the predetermined voltage level. Therefore, the output pulses of the circuit according to the present invention may be applied to an automatic attenuator used for readjusting signal attenuation until the input signal falls within bounds conveniently displayable on an oscilloscope. The present circuit is also found useful in regenerating trigger pulses used for gating the horizontal sweep generator of an oscilloscope apparatus, and also in many other applications.

Figure 2:
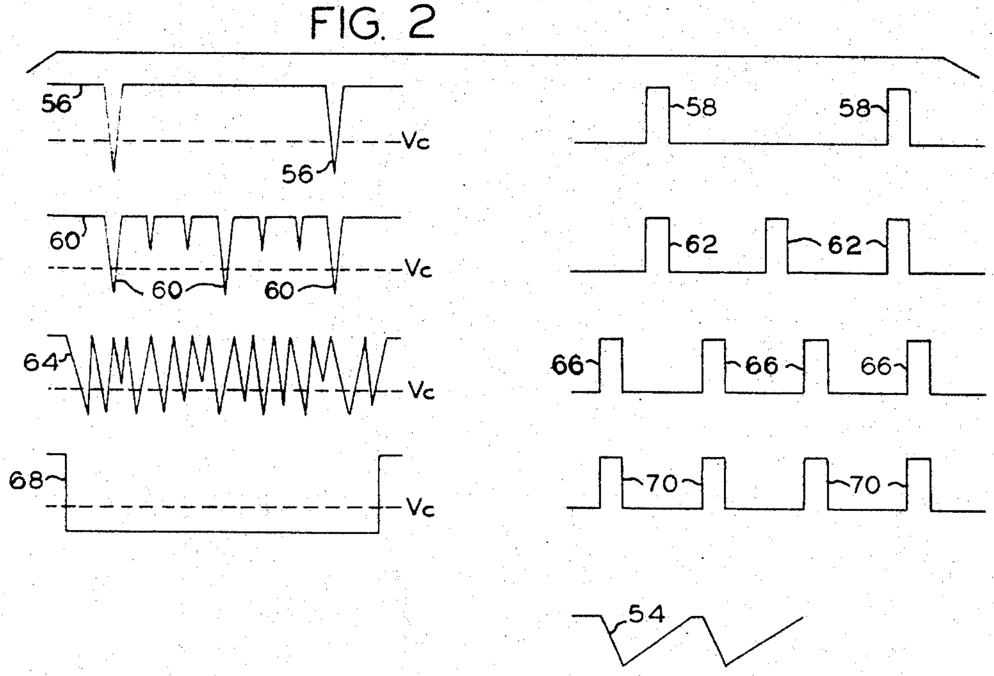

The subject matter which I regard as my invention is particularly pointed out and distinctly claimed in the concluding portion of this specification. The invention, however, both as to organization and method of operation, together with the further advantages and objects thereof, may best be understood by reference to the following description taken in connection with the accompanying drawings wherein like reference characters refer to like elements and in which:

FIG. 1 is a schematic diagram of a monostable comparator circuit in accordance with the present invention, and FIG. 2 is a chart of wave forms illustrating the operation of the FIG. 1 circuit.

Referring to the schematic diagram of FIG. 1, a first amplifier stage including transistor 10 is cross-coupled with a second amplifier stage comprising transistor 12. In accordance with this embodiment, transistor 10 is a PNP type transistor while transistor 12 is of the NPN type. These two transistors are cross-coupled so as to turn on and off together. That is to say, when transistor 10 conducts, the output signal thereof also causes transistor 12 to conduct and when transfer 10 is cut off, transistor 22 is cut off.

One cross-coupling extends from collector 14 of transistor 10 through coupling resistor 16 to base 18 of transistor 12, and the base 18 is connected to a negative reference potential source 20 through resistor 23. The negative source 20 may supply a potential on the order of 12 volts. Second cross-coupling circuitry extends from collector 22 of transistor 12 to base 24 of transistor 10 and includes a series combination of resistor 26 and capacitor 28. The time constant of this circuit determines the length of the output pulse from the monostable comparator circuit. Collector 22 of transistor 12 is returned to ground through load resistor 30.

Emitter 32 of transistor 10 is connected to positive voltage source terminal 34 through a resistor 36 of relatively high resistance in order to provide a source of relatively constant current for transistor 10. In this manner, transistor 10 can shut off at the conclusion of an output pulse, and will not draw a large current through emitter 32 when conducting so as to render shut off of transistor 10 less feasible. A hold off capacitor 38 functioning as an integrating means is connected between the emitter 32 and the negative voltage source 20. The hold off capacitor 38 could also be returned to another point of reference potential other than source 20. A unilateral conductor or diode 40 also has its cathode connected to an adjustable tap 42 of potentiometer 43 disposed between a negative voltage source terminal 44 and ground. The latter provides an adjustable negative voltage source.

Input signals presented between input terminal 46 and ground are applied through disconnect diode 48 to base 24 of transistor 10. The diode 48 has its anode connected to base 24 so that it ordinarily does not conduct at the same time as the diode 40 inasmuch as the latter is poled in the opposite direction. A resistor 50 connects base 24 to emitter 32 and thus to the adjustable negative voltage source through the diode 40. A signal source which may be applied between terminal 46 and ground includes an internal resistance 49.

The output of the circuit is conveniently derived from the collector 14 of transistor 10 through a connection to output terminal 52. One or more output pulses are produced at terminal 52 when initiated by triggering input signals applied to input terminal 46. A single trigger signal rising above a predetermined voltage will produce a single output pulse. However, a series of input signals or a steady DC voltage level of prescribed level at terminal 46 will produce a series of spaced output pulses as hereinafter more fully described.

According to the circuit's operation, a threshold level of triggering comparison $V_c$ is selected with adjustable tap 42 of potentiometer 43. Current normally flows from power supply terminal 34 through resistor 36 and diode 40 placing emitter 32 at substantially the same negative voltage level as adjustable tap 42. If an unknown signal is applied at terminal 46 through disconnect diode 48, and this signal is less negative with respect to ground than the comparison voltage, $V_c$, provided at tap 42, then disconnect diode 48 will not conduct, and neither will transistors 10 and 12. Neglecting semiconductor junction drop, the voltage $V_c$ is presented at the anode of diode 48, and an input signal applied at terminal 46 must become more negative than this voltage before diode 48 conducts. In practice, the junction offset voltage of the transistor is compensated for by readjusting the voltage at tap 42 of the potentiometer.

If a voltage more negative than $V_c$ is applied at terminal 46, diode 48 will start conducting, as will transistor 10. Conduction of transistor 10 initiates conduction of transistor 12 by way of coupling resistor 16. Similarly, transistor 12 is regeneratively coupled to the base of transistor 10 through resistor 26 and capacitor 28. The amplification of transistor 12 drives the base 24 of the transistor 10 rapidly negative. This positive feedback action between the transistors results in momentary latching with both transistors in the conducting condition. An output pulse is produced at terminal 52 so long as this condition remains. Feedback capacitor 28 charges through resistors 26 and the base of transistor 10. Transistor 10 is cut off when feedback capacitor 28 is almost fully charged and cannot supply sufficient base current to transistor 10 for retaining the latter in the conducting state.

During latching, that is when both transisors are conducting, transistor 10 conducts considerable current through emitter 32 and collector 14, thus discharging hold off capacitor 38 and also drawing current through load resistor 36. The voltage at the top of capacitor 38 drops, as the waveform 54 on the schematic diagram illustrates. Diode 40 is cut off inasmuch as the voltage at its anode is more negative than the voltage at tap 42. Both diodes 48 and 40 are nonconducting at this time. This is to say, the emitter voltage at the top of capacitor 38 is of such negative value as to disconnect both diodes.

When the output pulse concludes and both transistors cease conducting, both diodes 48 and 40 remain nonconducting until hold off capacitor 38 recharges through resistor 36 up to the aforementioned comparison voltage $V_c$. The time constant of the circuit including capacitor 38 and resistor 36 is arranged to be longer than that of the feedback circuit including resistor 26 and capacitor 28, and hence the circuit will remain unresponsive to an input triggerng signal at input terminal 46 for predetermined time after the duration of the output pulse, as determined in accordance with the time constant of the capacitor 38-resistor 36 combination. When the capacitor 38 is recharged to voltage $V_c$, diode 40 once again conducts drawing current through resistor 36. Another input trigger signal exceeding $V_c$ will render diode 48 conducting and cause the generation of another output pulse.

The waveform chart of FIG. 2 illustrates operation of the present circuit when several different types of input signals are applied thereto. An output is illustrated for each input signal. When very narrow pulses 56 are presented at input terminal 46 at a low repetition rate, an output pulse 58 is produced synchronized with each such input pulse. It is noted that each input pulse exceeds the comparison voltage $V_c$. A series of similar input pulses 60 will also cause a similar series of output pulses 62. However, smaller pulses intermediate the pulses 60 do not exceed $V_c$ and hence no output pulse is produced corresponding therewith. A high frequency signal 64 produces a series of output pulses 66 bearing a frequency relation to the input signal. If the frequency of the input is varied from a value not exceeding the basic rate of the FIG. 1 circuit to an operating point exceeding the basic rate of the FIG. 1 circuit, the FIG. 1 circuit starts countdown type operation without failure as the incoming rate is increased up to a million times faster.

When a continuous DC signal 68 is presented at the input terminal 46, the circuit also produces a series of output pulses 70. The circuit does not latch and fail to operate when such a DC level exceeding $V_c$ is presented at the input. Rather, the presentation of such a DC level turns on both transistors causing the generation of an output pulse, but after which hold off capacitor 38 prevents reconduction of diodes 48 and 40 for a predetermined period according to the time constant of the capacitor 38-resistor 36 combination. Then conduction of the diodes is again permitted so that triggering and another output pulse occurs.

Thus the circuit according to the present invention discriminates according to the magnitude of an input signal but is relatively insensitive to the frequency or shape of such input signal. An output will be produced for very narrow pulses having a low repetition rate, or for a continuous DC signal. Likewise, operation occurs without fail and without undue sensitivity to the frequency of the input signal as its frequency is increased. These desirable characteristics render the circuit according to the present invention useful in such applications as the vertical amplifier of automatic sensitivity-seeking oscilloscope, since such an oscilloscope should handle a wide variety of complex signals. In this type of appliaction to the circuit in accordance with the present invention continues to produce a repetitive pulse output so long as the input exceeds a particular threshold value, $V_c$. This pulse output may conveniently operate circuitry for adjusting input signal attenuation until the input signal applied to the circuit no longer exceeds the threshold value, $V_c$. Thus the input signal can be automatically attenuated to a somewhat standardized magnitude for convenient viewing on the screen of a cathode ray tube of given deflection. The circuit according to the present invention is also useful as a trigger regenerator producing standardized trigger pulses for appliaction to sweep gating circuits in a cathode ray oscilloscope, in response to a variety of input trigger signals.

While I have shown and described a preferred embodiment of my invention, it will be apparent to those skilled in the art that many changes and modifications may be made without departing from my invention in its broader aspects.

I claim:

1. A monostable comparator circuit for producing an output pulse in response to a given input signal comprising:
a first amplifier means, and a second amplifier means in cascade relation with said first amplifier means,
a first time constant means for coupling the output of said second amplifier means to the input of said first amplifier means,
means for coupling said input signal in triggering relation to said first amplifier means,
and a second time constant means in an output circuit of the said first amplifier means for rendering said first amplifier means unsusceptible to triggering for a predetermined period after production of an output pulse by said monostable comparator circuit.

2. A monostable comparator circuit for producing at least one output pulse upon triggering from an input signal comprising:
first and second cross-coupled stages includes a cross-coupling having a time constant circuit for determining the length of an output pulse produced by said multivibrator comparator circuit,
means for coupling an input signal to a first said stage, and a second time constant circuit shunt coupled across an output of said first stage,
said second time constant circuit having a longer effective time constant than said first time constant circuit so as to render said first stage susceptible to triggering by said input only after predetermined time determined by the time constant of said second time constant circuit.

3. A comparator circuit for producing at least one output pulse upon triggering from an input signal comprising:
an input source,
a first amplifier stage,
a second amplifier stage cross-coupled with said first amplifier stage including AC coupling means for causing regenerative conduction in said stages for a predetermined time upon application of an input signal from said input source,
integrating means coupled to a terminal of said first stage and means normally supplying a voltage level therefor,
and a unilateral conductor means located between said input source and an input of said first stage for coupling said input signal to an input of said first stage, said unilateral conductor being poled to conduct on a polarity of signals causing the said terminal of said first stage to drop below said voltage level in order to bring the voltage on said integrating means to a level biasing said first stage in a nonconducting condition for a predetermined time after said regenerative conduction dependant upon the time constant of said integrating means.

4. A circuit comprising:
a first amplifier stage,
a second amplifier stage cross-coupled with said first amplifier stage,
high impedance power supply means supplying said first stage being coupled to an output terminal of said first stage,
integrating means coupled across the output of said first stage between said output terminal and a point of common reference potential,
a normally conducting unilateral conductor coupling said output terminal to a predetermined voltage level for preventing the voltage on said output terminal from materially exceeding said predetermined voltage,
and another unilateral conductor for coupling said input signal to an input terminal of said first stage, poled to conduct on a polarity of signals causing said output terminal to drop below the voltage to which said first unilateral conductor is coupled in order to bring the voltage on said integrating means to a level biasing said first stage in a nonconducting condition for a predetermined time dependant upon the time constant of said integrating means.

5. A comparator circuit producing at least one output pulse upon triggering from an input signal comprising:
a PNP transistor and an NPN transistor in cross-coupled relation, each having its collector coupled to the base of the other,
one cross-coupling including an RC time constant circuit for determining the length of output pulses produced by said comparator circuit,
a capacitor coupled between the emitter of one of said transistors to a point of common reference potential,
an adjustable comparison voltage source,
a first diode coupling said emitter to said voltage source,
and an input disconnect diode for coupling input signals to the base of said one transistor,
said input disconnect diode being poled in a direction to conduct when input signals exceed the comparison voltage of said adjustable voltage source so as to render said first diode nonconducting, said capacitor rendering said input disconnect diode nonconducting.

6. A comparator circuit comprising
a PNP transistor and an NPN transistor each having its collector electrode coupled to the base of the other transistor,
a time constant circuit including a series capacitor located between the collector of the NPN transistor and the base of the PNP transistor,
a high resistance load resistor for coupling the emitter of said PNP transistor to a source of power,
a capacitor shunted between said emitter of the PNP transistor and a point of common reference potential,
an adjustable potentiometer supplied with a voltage and employed for selecting a variable voltage at a tap thereof,
a first diode coupling said emitter of said PNP transistor to the tap of said potentiometer,
and a second diode for coupling input signals to the base of said PNP transistor,
said second diode having its anode connected to said base, and said first diode having its anode connected to said emitter.

7. A comparator circuit comprising
an amplifier stage having an input and having an output,
said amplifier stage including unilateral conduction means through which an input signal is coupled to cause conduction of said amplifier stage, and regenerative means for temporarily increasing conduction in said stage in response to an input signal,
and integrating circuit means coupled across a conduction determining terminal means of said amplifier stage for temporarily biasing said amplifier stage including said unilateral conduction means in a nonconducting condition after conduction thereof so as to render said amplifier temporarily nonresponsive to an input signal.

8. A comparator circuit comprising
a transistor amplifier having a base terminal, an emitter terminal and a collector terminal,
means for causing operation of said amplifier for a predetermined time in response to an input signal, means for coupling said emitter terminal to a source of power, a source of adjustable voltage, and an integrating capacitor means coupling said emitter terminal to a point of common reference potential for acting to bias said emitter terminal in a non-conducting condition for a predetermined time after operation of said transistor amplifier rendering said transistor amplifier nonresponsive to input signals for such predetermined time.

9. A comparator circuit comprising a transistor amplifier having a base terminal, an emitter terminal and a collector terminal, means for coupling said emitter terminal to a source of power, a source of adjustable voltage, a unilateral conductor coupling said emitter terminal to said source of adjustable voltage wherein said unilateral conductor is poled to conduct in the opposite direction to said emitter terminal, and an integrating capacitor means coupling said emitter terminal to a point of common reference potential for acting to bias said emitter terminal in a non-conducting condition for a predetermined time after operation of said transistor amplifier rendering said transistor amplifier nonresponsive to input signals for such predetermined time.

10. The comparator circuit according to claim 9 including diode means for coupling an input signal to the base of said transistor amplifier, said diode means being poled to conduct in substantially the same direction as the emitter-base junction of said transistor amplifier.

11. The comparator circuit according to claim 9 further including a high resistance coupling means between the emitter of said transistor and source of power.

12. The comparator circuit according to claim 9 further including a second transistor amplifier in a cross-coupled relation to said first mentioned transistor amplifier and adapted to conduct in response to conduction of said first transistor amplifier supplying an amplified output signal to the base terminal of said second transistor amplifier.

References Cited

UNITED STATES PATENTS

| | | | |
|---|---|---|---|
| 2,770,732 | 11/1956 | Chong | 307—273 |
| 3,033,996 | 5/1962 | Atherton | 328—146 XR |
| 3,084,265 | 4/1963 | Cleland | 307—260 |
| 3,282,632 | 11/1966 | Arsem | 307—288 XR |
| 3,095,512 | 6/1963 | Little | 307—235 |

ARTHUR GAUSS, Primary Examiner

S. T. KRAWCZEWICZ, Assistant Examiner

U.S. Cl. X.R.

307—260, 273, 288, 293, 317; 328—67, 115, 150